United States Patent
Archer et al.

(10) Patent No.: US 10,070,640 B2
(45) Date of Patent: Sep. 11, 2018

(54) TERMITE BARRIER SEAL

(75) Inventors: Zane Archer, Queensland (AU); Neil Ashley Archer, Queensland (AU)

(73) Assignee: CHAZANE PTY LTD, Queensland (AU)

( * ) Notice: Subject to any disclaimer, the term of this patent is extended or adjusted under 35 U.S.C. 154(b) by 282 days.

(21) Appl. No.: 14/363,195

(22) PCT Filed: Sep. 11, 2012

(86) PCT No.: PCT/AU2012/001085
§ 371 (c)(1),
(2), (4) Date: Sep. 24, 2014

(87) PCT Pub. No.: WO2013/082645
PCT Pub. Date: Jun. 13, 2013

(65) Prior Publication Data
US 2015/0069059 A1    Mar. 12, 2015

(30) Foreign Application Priority Data

Dec. 8, 2011 (AU) ................................ 2011905120
Jun. 6, 2012 (AU) ................................ 2012902368

(51) Int. Cl.
*A01M 1/20* (2006.01)
*A01M 1/24* (2006.01)
(Continued)

(52) U.S. Cl.
CPC .............. *A01M 1/24* (2013.01); *A01M 1/245* (2013.01); *A01M 29/12* (2013.01); *E04B 1/72* (2013.01); *F16K 15/147* (2013.01)

(58) Field of Classification Search
CPC ........ A01K 97/10; A01K 87/02; A01K 87/00; A01K 89/033; A01K 99/00; F16M 13/022;
(Continued)

(56) References Cited

U.S. PATENT DOCUMENTS 5,058,312 A * 10/1991 Jackson ................ A01M 1/245
 43/124
5,205,067 A * 4/1993 Thomas .............. A01M 1/2055
 222/399

(Continued)

FOREIGN PATENT DOCUMENTS

FR    2829055    3/2003

OTHER PUBLICATIONS

International Search Report for PCT/AU2012/001085, Completed by the Australian Patent Office on Dec. 21, 2012, 6 Pages.

*Primary Examiner* — Tien Dinh
*Assistant Examiner* — George Andonyan
(74) *Attorney, Agent, or Firm* — Brooks Kushman P.C.

(57) ABSTRACT

A termite barrier seal including a hollow seal body having a wall surrounding an axial bore extending from an insertion end to a surface end. A closure formation is located about the surface end for engagement with a closure for the orifice of the bore at the surface end of the seal body. A one-way valve at or intermediate the insertion end and the surface end of the seal body, the one-way valve arranged to permit liquid flow through the axial bore, but to prevent liquid flow to the surface end. An external seal about the seal body for sealing the wall of the seal body against the internal surface of a hole drilled through a concrete slab. An internal seal engages the seal body for sealing the wall against an external face of an injector when inserted into the bore of the seal body.

4 Claims, 5 Drawing Sheets

(51) Int. Cl.
*E04B 1/72* (2006.01)
*A01M 29/12* (2011.01)
*F16K 15/14* (2006.01)

(58) Field of Classification Search
CPC ........ F16M 11/04; F16M 11/08; F16M 11/00; F16M 11/2014; F16M 2200/022; F16M 2200/027; B63B 2027/141; B63B 21/26; B63B 29/06; B63B 7/082; A01M 1/00; A01M 1/20; A01M 1/2022; A01M 1/24; A01M 1/245; A01M 7/00; A01M 7/0032; A01M 7/005; A01M 7/006; A01M 9/00; A01M 9/0076; A01M 17/00; A01M 17/002; A01M 19/00
USPC .......... 114/364, 102.28; 43/21.2, 124, 132.1, 43/131, 900; 248/227.3, 507; 52/101; 239/271
See application file for complete search history.

(56) References Cited

U.S. PATENT DOCUMENTS

| | | | | |
|---|---|---|---|---|
| 6,357,170 | B1* | 3/2002 | Bordes, Jr. | A01M 1/026 43/121 |
| 6,964,124 | B2* | 11/2005 | Brode, III | A01M 1/026 43/131 |
| 7,497,047 | B1* | 3/2009 | Aesch, Jr. | A01M 1/026 43/132.1 |
| 2002/0108295 | A1* | 8/2002 | Aesch, Jr. | A01M 1/026 43/132.1 |
| 2002/0116866 | A1 | 8/2002 | Aesch, Jr. et al. | |
| 2008/0314858 | A1* | 12/2008 | Twohig | B65D 47/2031 215/307 |
| 2010/0194060 | A1* | 8/2010 | Blanco | A61B 17/34 277/650 |
| 2011/0024664 | A1* | 2/2011 | Burnard | F16K 15/147 251/324 |

* cited by examiner

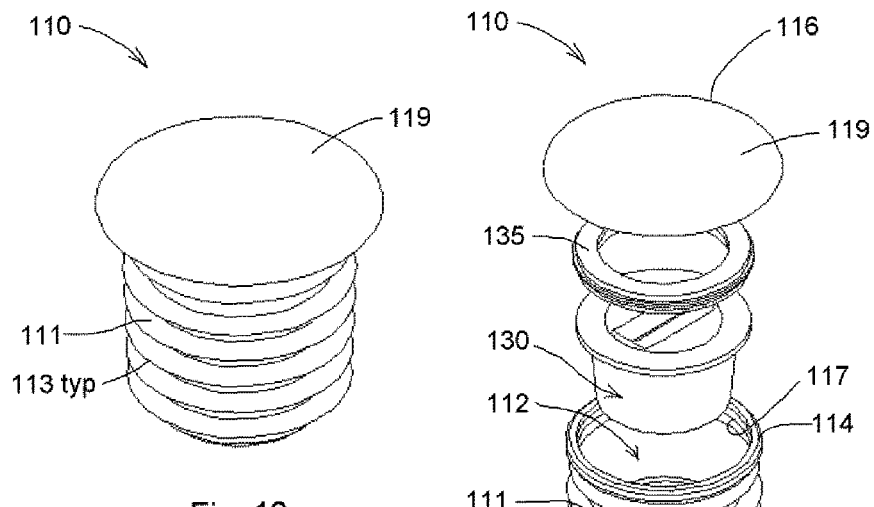
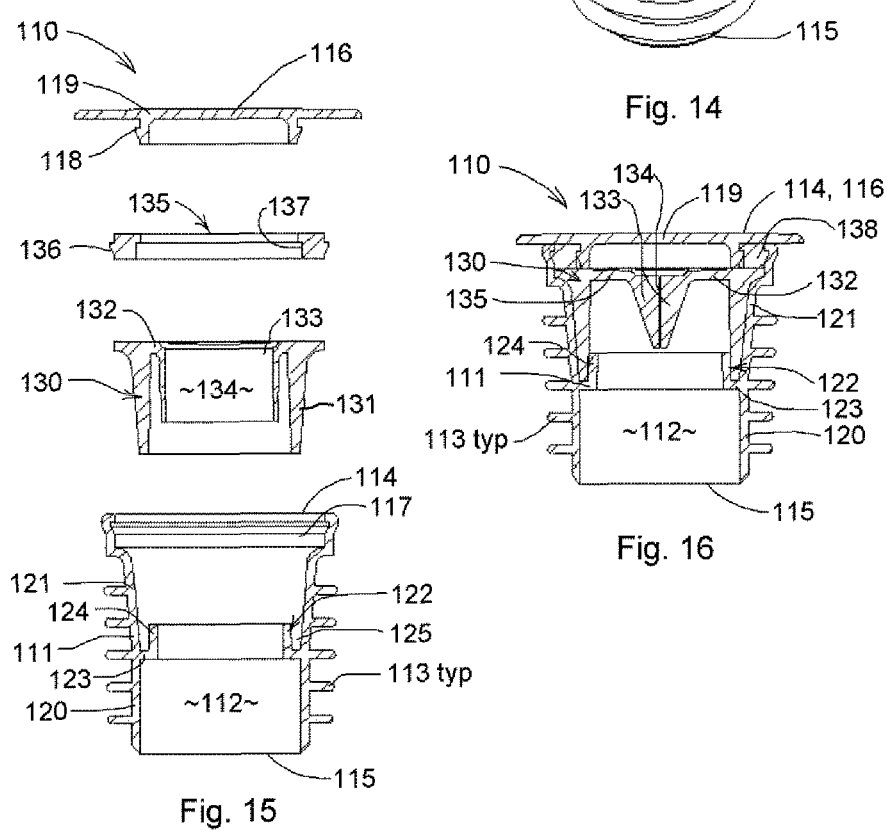

TERMITE BARRIER SEAL

CROSS-REFERENCE TO RELATED APPLICATION

This application is the U.S. national phase of PCT Application No. PCT/AU2012/001085 filed on Sep. 11, 2012, which claims priority to Australian Patent Application No. 2011905120 filed on Dec. 8, 2011 and Australian Patent Application No. 2012902368 filed on Jun. 5, 2012, the disclosures of which are incorporated in their entirety by reference herein.

This invention relates to a termite barrier seal. The invention has particular application to a termite barrier seal for sealing concrete slabs against unintentional leakage of termicidal formulations from soil beneath concrete slabs.

Termite barriers in chemical form are normally established and maintained by injecting liquid termicidal formulations into the soil beneath concrete slabs through apertures penetrating the concrete slab at regular spacings from one another. Maintenance of the termite barrier requires regular injection of the termicidal formulation through the apertures. Although this technique is well established, it has long been a problem that termicidal formulation can leak from the subsoil through the aperture where the injector is used to inject the liquid as well as from apertures adjacent the aperture through which the termicidal formulation is injected.

Plugs have been provided, each typically having a series of disks axially spaced along a shaft, a shaped "insertion" end of the shaft by which the plug may be inserted into a hole drilled through a concrete slab, and a disk-like capping on the other end, for convenience referred to herein as a "surface" end since plug is meant to be inserted into the hole until the surface-end disk is in substantial planar alignment with the upper surface of the concrete slab. However, the plugs perform more as a cosmetic closure of the holes drilled for injection of termicidal formulations, the axially spaced disks being provided for retaining the plugs in the holes rather than for sealing against liquid transfer across the concrete slab. It is appreciated that some sealing function may incidentally be provided, but not against the fluid pressures encountered when termicidal formulations are injected into sub-slab soils.

The present invention aims to provide a termite barrier seal which alleviates one or more of the aforementioned problems. Other aims and advantages of the invention may become apparent from the following description.

With the foregoing in view, in one aspect the present invention resides broadly in a termite barrier seal including:

a hollow seal body having a wall surrounding an axial bore extending from an insertion end to a surface end;

a closure formation about the surface end for engagement with a closure cap for closing the orifice of the bore at the surface end of the seal body when engaged with the closure formation;

one-way valving means at or about the insertion end or intermediate the insertion end and the surface end of the seal body, the one-way valving means being arranged to permit liquid flow through the axial bore from the surface end to the insertion end, but to prevent liquid flow through the axial bore from the insertion end to the surface end;

external seal means about an external surface of the wall of the seal body for sealing the wall of the seal body against the internal surface of a hole drilled through a concrete slab; and internal seal means about an internal surface of the wall of the seal body for sealing the wall of the seal body against an external face of an injector when inserted into the bore of the seal body.

In another aspect, the present invention resides broadly in a method of establishing or maintaining a termite barrier to the ground beneath a concrete slab through a plurality of penetrations therethrough including:

providing a seal in each penetration, each seal having an insertion end adjacent the ground beneath the concrete slab and a surface end remote from the insertion end;

injecting a termicidal fluid through an injector nozzle sealingly inserted through one of the seals, the termicidal fluid being prevented from being expelled from the ground beneath the concrete slab through the remaining penetrations by one-way valving means incorporated in the seals.

Preferably, the seal includes internal and external seal for sealing about the injector and the penetration through a concrete slab. Preferably, the method includes capping the seal with a closure cap for closing the orifice of the bore at the surface end of the seal.

The closure cap may be attached to or integrally formed with the seal body, a flexible attachment formation joining the closure to the seal body. The closure cap includes complementary formations formed for sealing engagement with the closure formation about the surface end of the seal body. Preferably, a closure seal is provided for sealing interposition between the sealing cap and the complementary formations.

When provided as an attached closure cap, the flexible attachment means is provided as a live hinge whereby the closure cap may be moved with respect to the seal body from a closed position at which the closure cap sealing closes the orifice of the bore through the seal body and an open position at which the closure cap is substantially clear of the orifice of the bore through the seal body.

Preferably, the one-way valve means is provided as a pair of opposed gate members which may be opened by movement from a sealing position and an open position by relative movement towards the insertion end from the surface end. The gate members are resiliently deflectable from the closed position to provide the opening and closing movement and further each include an abutment face. Each abutment face provides sealing engagement with the other and is so formed with respect to the remainder of the gate formation that pressure applied from the insertion end to the surface end applies additional closing and sealing force of the abutment faces against one another.

Alternatively, the one-way valve means is provided in the form of a plurality of flaps or fingers formed extending from the insertion end of the wall about the entrance to the bore, the flaps having abutable side edges which sealingly abut against one or more abutable side edges of an adjacent flap. In such form, the flaps are moveable between an open position at which the abutable side edges are separated from one another, thereby permitting liquid to pass through from the surface end to the insertion end through the bore of the seal body, and a sealingly closed position at which the abutable side edges sealingly abut against one or more abutable side edges of an adjacent flap, the abutable side edges being so arranged that the flaps collectively seal the bore of the seal body against liquid passing through from the insertion end to the surface end. In such form, the flaps are preferably provided in conical form when in their sealingly abutting disposition, each flap being divided from its abutting neighbour by a slit extending from the apex of the cone to its base substantially at right angles to the perimeter of the base of the cone.

Preferably, the one-way valve means is removable as a separate element from the remainder of the seal body. For convenience, separate element is referred to as a seal element and the remainder of the seal body is referred to as a seal body stub. In such form, the seal element may be sealingly engaged with the seal body stub by a secondary sealing formation.

Preferably, the external seal means includes a radial protrusion extending outward from the outer face of the wall of the seal body. More preferably, the seal means includes a plurality of spaced protrusions of substantially the same form. In a preferred form the protrusions are provided as a set of regularly spaced annular disc formations extending radially outward from the outer face of the wall of the seal body.

Alternatively, the external seal means includes one or more circumferential channels about the external face of the wall of the seal body and a gasket or o-ring insertable into the channel or channels. In each alternative form, the external sealing means extends radially outward a distance sufficient to provide an interference fit against the inner face of a bore hole formed or drilled through a concrete slab for injection of termicidal formulation into the soil beneath the slab.

Preferably, the internal seal means includes a radial protrusion extending inward from the inner face of the wall of the seal body. Preferably, the inward protrusion is of substantially the same form as the external protrusion of the external seal means, but in the opposite radial direction. In the preferred form having the separate seal element and seal body stub, the internal seal means is formed with the secondary sealing formation.

Preferably, the termite barrier seal is formed from a rigid, but resilient plastics material, such as polyethylene, polypropylene, polybutylene or similar such polyolefin or thermoplastics material. Alternatively, thermosetting elastomeric materials may also be used.

In order that the invention may be more readily understood and put into practical effect, an exemplary embodiment of the present invention will now be described with reference to the following drawings, and wherein:

FIG. 1 is a pictorial view of a termite barrier seal according to the invention;

FIGS. 2 and 3 constitute a front elevation and plan view from below of termite barrier seal of FIG. 1;

Figure 1:
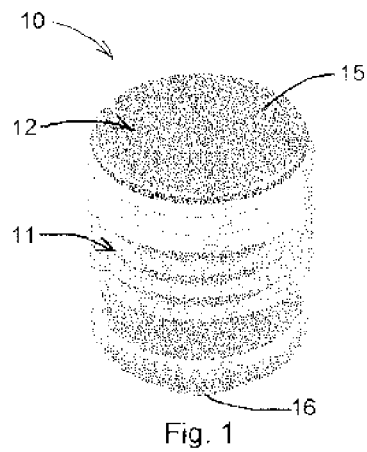
Figure 2:
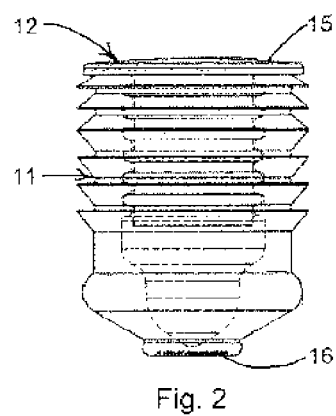
Figure 3:
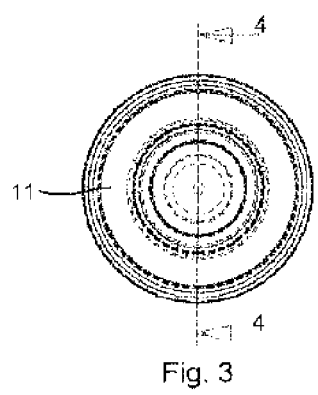
Figure 5:
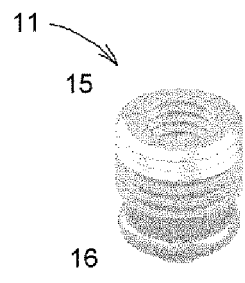
FIG. 5 is a pictorial view of a body portion for the termite barrier seal of FIG. 1.
Figure 6:
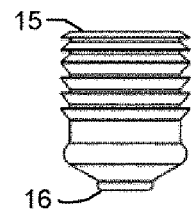
Figure 7:
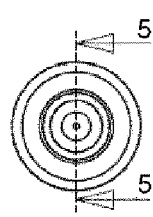
Figure 8:
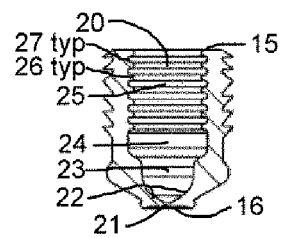
Figure 9:
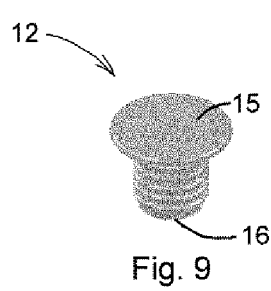
Figure 10:
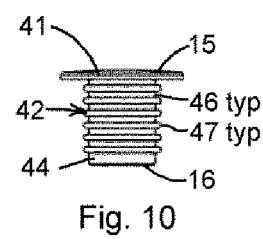
Figure 11:
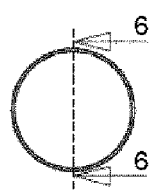
Figure 12:
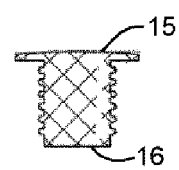
Figures 17, 18:
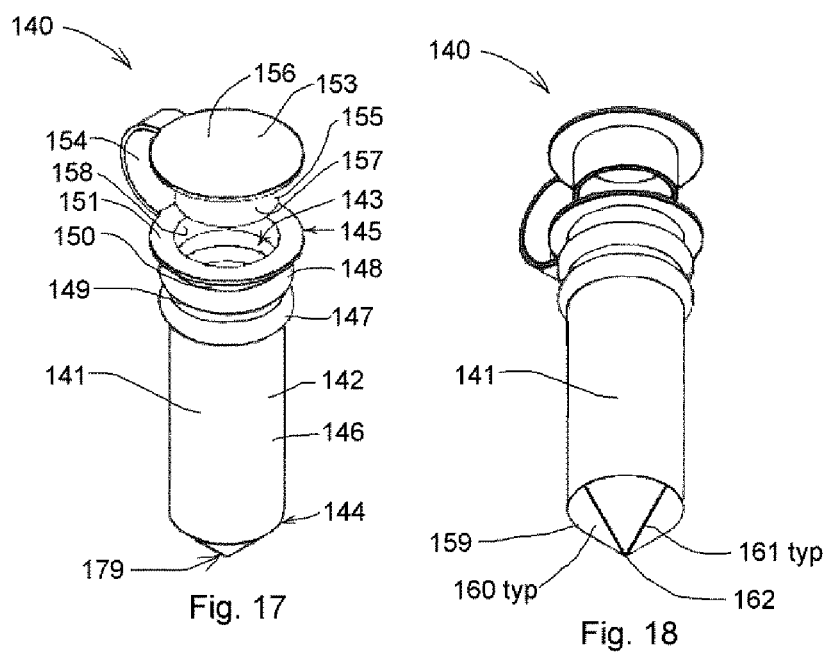
Figure 19:
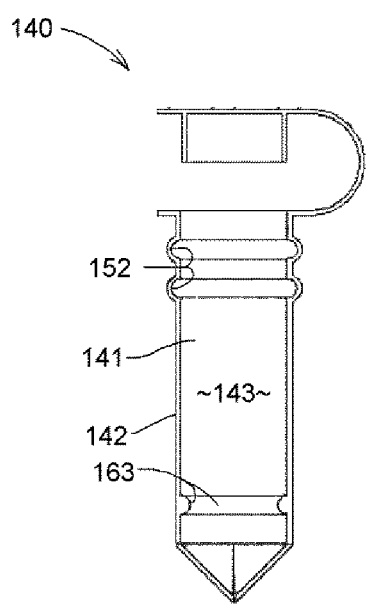
Figure 22:
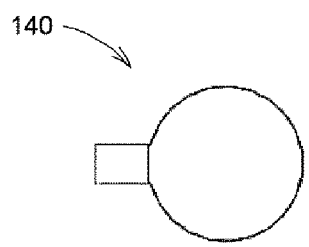
Figure 20:
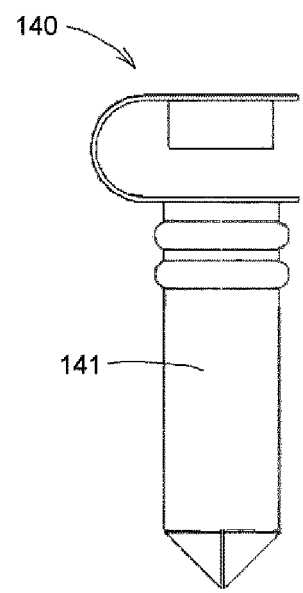
Figure 21:
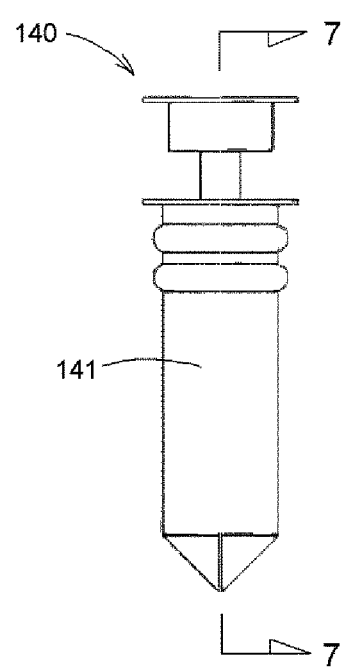
Figure 23:
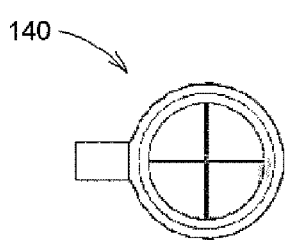

FIGS. 6 and 7 constitute a front elevation and plan view of body portion of FIG. 5;

FIG. 8 is a section view of the body portion of FIG. 5 along line 5-5 of FIG. 7;

FIG. 9 is a pictorial view of a cap portion for the termite barrier seal of FIG. 1;

FIGS. 10 and 11 constitute a front elevation and plan view of cap portion of FIG. 9;

FIG. 12 is a section view of the body portion of FIG. 9 along line 6-6 of FIG. 11;

FIG. 13 is pictorial view from above of another termite barrier seal according to the invention;

FIG. 14 is an exploded view from above of the termite barrier seal of FIG. 13;

FIG. 15 is an exploded side sectional view of the termite barrier seal of FIG. 13;

FIG. 16 is a front sectional view of the termite barrier seal of FIG. 13;

FIG. 17 is pictorial view from above of an alternative termite barrier seal according to the invention;

FIG. 18 is a pictorial view from below of the alternative termite barrier seal of FIG. 17;

FIG. 19 is a sectional view of the alternative termite barrier seal on line 7-7 of FIG. 16; and FIGS. 20 to 23 collectively illustrate the alternative termite barrier seal of FIG. 13 in orthographic projection, being a front elevation, side elevation, plan from above and plan from below respectively.

The termite barrier seal 10 is illustrated in FIGS. 1 to 4, and in its two parts, the body portion 11 and the cap portion 12 in FIGS. 5 to 12. The termite barrier seal and its constituent parts each have a surface end 15 and an insertion end 16. The body portion includes a shaped central bore 20 extending axially through from the surface end to terminate at a blind end at or near the insertion end to form a membrane 21. The shaped central bore includes an inverted dome portion 22 which forms the inner face of the membrane, the outer face of the membrane being substantially planar and substantially circular formed by the outer surface of that part of the body portion.

Figure 4:
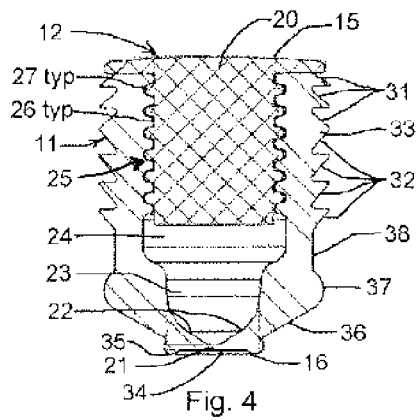
FIG. 4 is a section view of the termite barrier seal of FIG. 1 along line 4-4 of FIG. 3.

Referring particularly to FIG. 4, the shaped central bore also has an engagement portion 23 depending axially from the dome portion towards the surface end and sized for engaging with the outer face of an injector, the diameter being selected to provide an interference fit therewith when the injector is inserted into the shaped central bore. The shaped central bore also has a plenum portion 24 depending axially from the engagement portion towards the surface end and having a diameter larger than that of the engagement portion. The shaped central bore also has a closure formation in the form of a ribbed portion 25 extending from the plenum portion to the surface end orifice of the shaped central bore, the ribbed portion having seven axially spaced inner ribs shown typically at 26 separated by corresponding annular channels shown typically at 27, the inner ribs and channels being substantially square in section.

The outer surface of the body portion has a three surface end ribs 31 about the surface end and spaced axially from one another and four intermediate ribs 32 extending axially from the surface end ribs and spaced axially from one another, the surface end rib furthest from the surface end merging with the intermediate rib nearest the surface end at a merged rib 33. It will be appreciated that the counting of the ribs above includes the merged rib. The surface end ribs have a saw-tooth profile, the sloping sides of the profile facing the surface end. The intermediate ribs have a substantially identically dimensioned saw-tooth profile the opposite way around from that of the surface end ribs. The external ribs extend axially along the outer surface about the same length as the inner ribs extending along the shaped central bore.

The insertion end of the body portion terminates in a crater-form concavity 34 forming the outer face of the membrane previously described, the concavity having a lip 35 with substantially cylindrical side walls which proceed axially to a frusto-conical portion 36. The frusto-conical portion extends axially to terminate in a hip portion 37. A waist portion 38 in interposed axially between the hip portion and the intermediate rib closest to the insertion end.

The axial disposition of the waist portion approximates the axial disposition of the plenum portion along the shaped central bore.

The cap portion illustrated in FIG. 10 has a closure disk 41 in circular form and having a diameter slightly less than the outer diameter of the surface end of the body portion. A cap griping portion 42 constitutes the remainder of the cap portion extending axially from the closure disk to the insertion end of the cap portion and has a plurality of complementary ribs shown typically at 47 separated by corresponding complementary channels shown typically at 46 and terminating with an end rebate 44. The complementary ribs are sized and spaced from one another for engagement with corresponding annular channels and the complementary channels are sized to be engaged by the inner ribs of the body portion.

The other termite barrier seal 110 illustrated in FIGS. 13 to 16 includes a hollow seal body 111 having a bore 112 extending therethrough and a set of five annular disk-like projections shown typically at 113 at regular intervals spaced axially along the outside face. The hollow seal body has a surface end 114 and an insertion end 115, so referred because the insertion end is the end by which the termite barrier seal is inserted into a hole to be sealed in a concrete slab or the like, and being so inserted that the surface end lies substantially aligned with the surface of the concrete slab or such like.

A sealing cap 116 is provided for sealing engagement about the complementary sealing formations 117 about the orifice of the surface end of the hollow seal body. The sealing cap has sealing formations 118 about a cylindrical portion which depends downward from a substantially circular capping disc 119.

The hollow seal body has a cylindrical portion 120 extending from the insertion end axially about half of the length of the hollow seal body and a tapered portion 121 extending from the surface end of the seal body to the cylindrical portion. A valve support formation 122 projects inward from the inside face of the bore. The valve support formation has a flange portion 123 extending inward radially and a wall portion 124 extending axially from the inner edge of the flange portion part way toward the surface end. The wall portion is spaced inward from the inner face of the bore to provide an annular channel 125, the base of which is formed by part of the flange portion.

A valve body 130 is provided as a separate element for insertion into the tapered portion of the hollow seal body. The valve body includes a skirt 131 depending axially from a valve element support ring 132. The skirt has a tapered outer face substantially commensurate with the tapered inner face of the tapered portion of the hollow seal body. The distal extremity of the skirt is also commensurate with the annular channel in the valve support formation.

The valve body has two opposed gate members 133, one if which can be seen in the sectional view of FIG. 15 and both of which can be seen in FIGS. 14 and 16. Each gate portion has an abutment face 134 aligned substantially with a bisecting plane of the valve body. A flexible flange portion 135 connects the gate members to the valve element support ring to provide for the movement of the gate members away from each other and the valve element support ring when displaced by a solid body, such as the nozzle of a termicidal injector, through the valve body.

An annular retainer seal 135 is interposed between the sealing cap and the complementary sealing formations of the hollow seal body. The outer edge 136 of the annular retainer seal engages with the complementary sealing portions of the hollow seal body and the inner edge 137 engages with the sealing formations of the sealing cap. The annular retainer seal also retains the valve body by engaging the upper face of the valve element support ring.

The alternative termite barrier seal 140 illustrated in FIGS. 17 to 23 includes an integral hollow seal body 141 a wall 142 surrounding an axial bore 143 extending from an insertion end 144 to a surface end 145. The wall includes a cylindrical portion 146 extending from the insertion end to two external seal bands, a lower seal band 147 and an upper seal band 148 extending radially outward from the outer face of the wall of the seal body spaced axially towards the surface end from the cylindrical portion and from one another by an intermediate cylindrical portion 149.

An upper cylindrical portion 150 of the wall of the seal body extends axially from the upper seal band, the surface end of the wall terminating with a flange 51 extending radially outward from the outer face of the wall, the radial extent of the flange being somewhat greater than the radial extent of the external seal bands. The external seal bands are substantially semicircular in tangential section of the wall providing a semicircular ridge about the seal body. As can be seen in the sectional view of FIG. 19, the external seal bands each form an internal circumferential channel 152 also substantially semicircular in section. The seal bands are formed to sealingly engage the internal surface of a hole drilled through a concrete slab into which the termite barrier seal in inserted.

A closure lid 153 is attached to the outer edge of the flange by a connection band 154. The closure lid includes a cylindrical body portion 155 and a circular cap portion 156 extending radially inward and outward from one end—the outer end—of the cylindrical body portion. The outer face 157 of the cylindrical body portion is sized to sealingly fit into the bore of the seal body by engagement with the inner face 158 of the upper wall portion of the seal body, the closure lid being moveable with respect to the seal body by virtue of the flexible nature of the connection band.

A one-way valve assembly 159 is provided at and extending from the insertion end of the wall of the seal body. The valve assembly permits liquid flow through the axial bore from the surface end to the insertion end, but prevents liquid flow through the axial bore from the insertion end to the surface end. The valve assembly includes four conical segments shown typically at 160, each conical segment being arranged in side-by-side abutting to two other conical segments to form a complete cone as shown, the conical segments being separated from one another by a slit shown typically at 161 extending axially and radially from the apex 162 of the cone. The conical segments are formed from resiliently flexible material, such that liquid pressure from the surface end to the insertion end causes the conical segments to flex outward and away from one another. Application of liquid pressure in the reverse direction, that is, from the insertion end to the surface end, urges the conical segments towards and into sealing engagement with one another.

As may be seen in FIG. 19, an internal seal formation is provided in the form of an annular ridge 63 formed about the internal face of the wall of the seal body. The annular ridge has a substantially semicircular section projecting inward from the inner face of the wall of the seal body and is spaced intermediate the lower seal band and the insertion end of the wall of the seal body, but closer to the insertion end. The relative sizes of the relevant elements of the termite barrier seal and the holes into which such seals are to be inserted in accordance with the present invention are selected such that an injector is sealed against liquid flowing through the bore of the seal body, irrespective of whether the conical segments of the one way valve assembly are pushed open by the injector.

In use, a plurality of termite barrier seals according to the present invention are provided for insertion, one each, into holes drilled or otherwise formed in a concrete slab or such like. The lids are normally closed, but may be opened for insertion of the nozzle of an injector by way of which termicidal chemical formulations may be injected. The gate members or conical segments of the valve assembly prevent liquid from flowing from beneath the slab through the holes. The injector is inserted into one of the barrier seals, and the internal seal prevents liquid from flowing back through hole between the nozzle and the seal. The external ribs or protrusions also prevent the liquid from flowing back through the holes.

The closure lid is used to close each termite barrier seal each time the injector is removed, and successive barrier seals are used in turn, or according to a predetermined order, for application of the required amount of termicidal chemical formulation beneath the concrete slab or slab. The engagement of the sealing formations of the sealing cap are arranged to engage with the inner edge of the annular retainer seal with less engagement force than the engagement of the outer edge of the annular retainer seal with the complementary sealing portions of the hollow seal body so that the sealing cap may be removed and replaced without disturbing the retention of the valve body in the hollow seal body.

Although the invention has been described with reference to a specific example, it will be appreciated by persons skilled in the art that the invention may be embodied in other forms within the broad scope and ambit of the invention as herein set forth and defined by the following claim.

The invention claimed is:

1. A termite barrier seal including:
    a) a hollow seal body having a wall surrounding an axial bore extending from an insertion end to an orifice at a surface end, the bore terminating at a blind end at or near the insertion end to form a membrane including an inverted dome portion which may be opened by movement from a sealing position to an open position by relative resilient deflection towards the insertion end from the surface end by an external face of an injector when inserted into the bore of the seal body and arranged to permit liquid flow through the axial bore from the surface end to the insertion end, but to prevent liquid flow through the axial bore from the insertion end to the surface end when the injector is inserted into the bore of the seal body;
    b) a closure formation about the surface end for engagement with a closure;
    the closure for closing the orifice of the bore at the surface end of the seal body when engaged with the closure formation;
    c) at least one resilient external seal means about an external surface of the wall of the seal body for sealing the wall of the seal body against an internal surface of a hole drilled through a concrete slab;
    d) a bulbous resilient engagement portion extending radially inwardly from the wall into the axial bore and depending axially from the dome portion towards the surface end and sized for engaging with the external face of an injector when inserted into the bore of the seal body, to provide an interference fit with the external face of an injector when the injector is inserted into the bore, and
    e) an enlarged bulbous hip portion extending radially outwardly from the external surface of the wall of the seal body concentrically outside the resilient engagement portion.

2. The termite barrier seal according to claim 1, wherein the resilient engagement portion is provided by a radially inwardly projecting annular member.

3. The termite barrier seal according to claim 2, wherein the radially inwardly projecting annular member is defined between a substantially planar circular inner surface of a plenum in the axial bore and the inverted dome portion of the axial bore, providing a seal against liquid passing through from the insertion end to the surface end.

4. A termite barrier seal including:
    a) a hollow seal body having a wall surrounding an axial bore extending from an insertion end to an orifice at a surface end, the bore terminating at a blind end at or near the insertion end to form a membrane including an inverted dome portion which may be opened by movement from a sealing position to an open position by relative resilient deflection towards the insertion end from the surface end by an external face of an injector when inserted into the bore of the seal body and arranged to permit liquid flow through the axial bore from the surface end to the insertion end, but to prevent liquid flow through the axial bore from the insertion end to the surface end when the injector is inserted into the bore of the seal body;
    b) at least one resilient external seal means about an external surface of the wall of the seal body for sealing the wall of the seal body against an internal surface of a hole drilled through a concrete slab;
    c) a bulbous resilient engagement portion extending radially inwardly from the wall into the axial bore and depending axially from the dome portion towards the surface end and sized for engaging with the external face of an injector when inserted into the bore of the seal body, to provide an interference fit with the external face of an injector when the injector is inserted into the bore, and
    d) an enlarged bulbous hip portion extending radially outwardly from the external surface of the wall of the seal body concentrically outside the resilient engagement portion.

* * * * *